(12) United States Patent
Nishio

(10) Patent No.: US 8,593,844 B2
(45) Date of Patent: Nov. 26, 2013

(54) INTERCONNECTION INVERTER DEVICE

(75) Inventor: Naoki Nishio, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 72 days.

(21) Appl. No.: 13/375,947

(22) PCT Filed: Jul. 30, 2009

(86) PCT No.: PCT/JP2009/063594
§ 371 (c)(1),
(2), (4) Date: Dec. 2, 2011

(87) PCT Pub. No.: WO2011/013233
PCT Pub. Date: Feb. 3, 2011

(65) Prior Publication Data
US 2012/0075899 A1    Mar. 29, 2012

(51) Int. Cl.
H02M 7/44    (2006.01)

(52) U.S. Cl.
USPC .......................................... 363/97; 363/132

(58) Field of Classification Search
USPC ........ 363/95, 97, 98, 131, 132, 40, 41, 43, 17
See application file for complete search history.

(56) References Cited

U.S. PATENT DOCUMENTS

| | | | |
|---|---|---|---|
| 5,436,819 A * | 7/1995 | Mikami et al. | 363/41 |
| 6,172,882 B1 * | 1/2001 | Tanaka et al. | 363/17 |
| 6,310,787 B2 * | 10/2001 | Ito et al. | 363/34 |
| 6,392,907 B1 * | 5/2002 | Ichikawa | 363/98 |
| 7,245,508 B2 * | 7/2007 | Tokuda et al. | 363/17 |
| 7,872,887 B2 * | 1/2011 | Nishio et al. | 363/97 |
| 8,111,531 B2 * | 2/2012 | Ilic | 363/132 |
| 8,400,799 B2 * | 3/2013 | Fujiyoshi et al. | 363/98 |
| 2007/0047275 A1 * | 3/2007 | Hesterman et al. | 363/95 |
| 2008/0298103 A1 * | 12/2008 | Bendre et al. | 363/89 |
| 2009/0316458 A1 * | 12/2009 | Gonzalez Senosiain et al. | 363/132 |
| 2010/0118575 A1 * | 5/2010 | Reschenauer | 363/126 |
| 2010/0202176 A1 * | 8/2010 | Hallak | 363/131 |
| 2013/0070504 A1 * | 3/2013 | Xu et al. | 363/132 |

FOREIGN PATENT DOCUMENTS

| | | | | |
|---|---|---|---|---|
| EP | 1858149 | * | 11/2007 | ............. H02M 7/48 |
| JP | 8-98549 | A | 4/1996 | |
| JP | 2004-104963 | A | 4/2004 | |
| JP | 2004-135408 | A | 4/2004 | |

OTHER PUBLICATIONS

International Search Report (PCT/ISA/210) issued on Oct. 20, 2009, by Japanese Patent Office as the International Searching Authority for International Application No. PCT/JP2009/063594.
Written Opinion (PCT/ISA/237) issued on Oct. 20, 2009, by Japanese Patent Office as the International Searching Authority for International Application No. PCT/JP2009/063594.

* cited by examiner

Primary Examiner — Gary L Laxton
Assistant Examiner — Kyle J Moody
(74) Attorney, Agent, or Firm — Buchanan Ingersoll & Rooney PC

(57) ABSTRACT

First and second capacitors are connected in series between positive/negative electrodes of a DC power source. A first terminal of a reactor and a first terminal of an electric power system are connected to the interconnection point between the first and second capacitors. A first switch section has first and second terminals respectively connected to the positive electrode of the DC power source and a second terminal of the reactor. A second switch section has first and second terminals respectively connected to the negative electrode of the DC power source and the second terminal of the reactor. A third switch section has first and second terminals respectively connected to the second terminal of the reactor and a second terminal of the electric power system. A fourth switch section has first and second terminals respectively connected to the second terminal of the reactor and the second terminal of the electric power system.

8 Claims, 4 Drawing Sheets

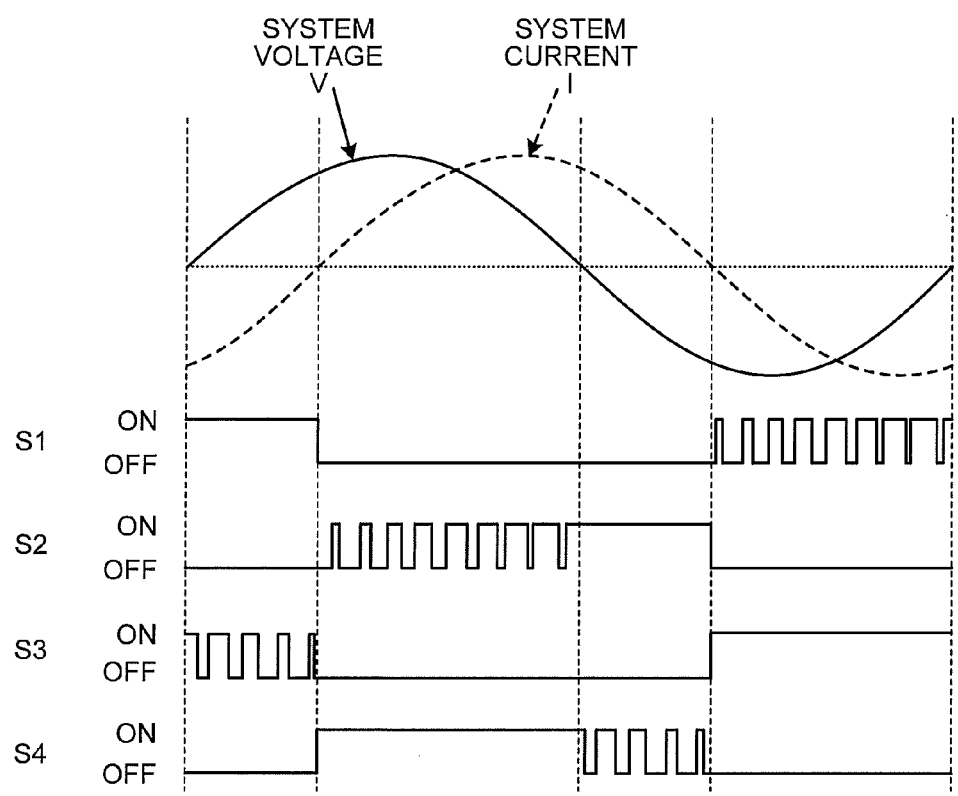

INTERCONNECTION INVERTER DEVICE

FIELD

The present invention relates to an interconnection inverter device which converts direct-current power fed from a direct-current power source to alternating-current power to interconnect to an electric power system.

BACKGROUND

An interconnection inverter device according to a conventional technique of this type includes, for example, one that is disclosed in Patent Literature 1 below. The interconnection inverter device disclosed in Patent Literature 1 is configured to include first power conversion unit which has a step-down function and is disposed on the input side of a reactor; second power conversion unit which has a step-up function and is disposed on the output side of the reactor; and third power conversion unit disposed on the output side of the second power conversion unit to convert a direct current to an alternating current and then output the resulting current to an electric power system. The device provides control to switch between the first power conversion unit and the second power conversion unit depending on the system voltage and the magnitude of an input voltage to the first power conversion unit.

CITATION LIST

Patent Literature

Patent Literature 1: Japanese Patent Application Laid-open No. 2004-104963

SUMMARY

Technical Problem

However, the interconnection inverter device disclosed in Patent Literature 1 mentioned above always requires the first power conversion unit serving as a step-down circuit and the second power conversion unit serving as a step-up circuit, leading to an increase in circuit scale and loss.

Furthermore, this interconnection inverter device has to provide control to the first power conversion unit that is a step-down circuit when the input voltage is higher than the system voltage and to the second power conversion unit that is a step-up circuit when the input voltage is lower than the system voltage. This is combined with the control that is provided to third power conversion unit for converting a direct current to an alternating current, resulting in further complication in control.

The present invention was developed in view of the aforementioned problems. It is therefore an object of the invention to provide an interconnection inverter device which requires neither step-up circuit nor step-down circuit and can be controlled in a simplified manner.

Solution To Problem

In order to solve the aforementioned problems, an interconnection inverter device for converting direct-current power fed from a direct-current power source to alternating-current power to interconnect to an electric power system according to one aspect of the present invention is constructed in such a manner as to include: first and second capacitors which are connected in series to both ends of the direct-current power source and an interconnection point of which is connected to one end of the electric power system; a reactor with one end connected to the connection point between the first capacitor and the second capacitor; a first switch section with one end connected to a positive electrode of the direct-current power source and the other end connected to the other end of the reactor; a second switch section with one end connected to a negative electrode of the direct-current power source and the other end connected to the other end of the reactor; a third switch section with one end connected to the other end of the reactor and the other end connected to the other end of the electric power system; a fourth switch section with one end connected to the other end of the reactor and the other end connected to the other end of the electric power system; and a third capacitor connected to both ends of the electric power system in parallel thereto.

Advantageous Effects of Invention

The present invention advantageously provides an interconnection inverter device which is reduced in size, weight, and loss because step-up circuits or step-down circuits are obviated and control can be provided in a simplified fashion.

BRIEF DESCRIPTION OF DRAWINGS

FIG. 7 is a time chart illustrating one-cycle switching operation of the interconnection inverter device of the third embodiment.

DESCRIPTION OF EMBODIMENTS

Now, an interconnection inverter device according to the embodiments of the present invention will be described below in more detail with reference to the accompanying drawings. Note that the descriptions below will not limit the present invention.

First Embodiment

Figure 1:
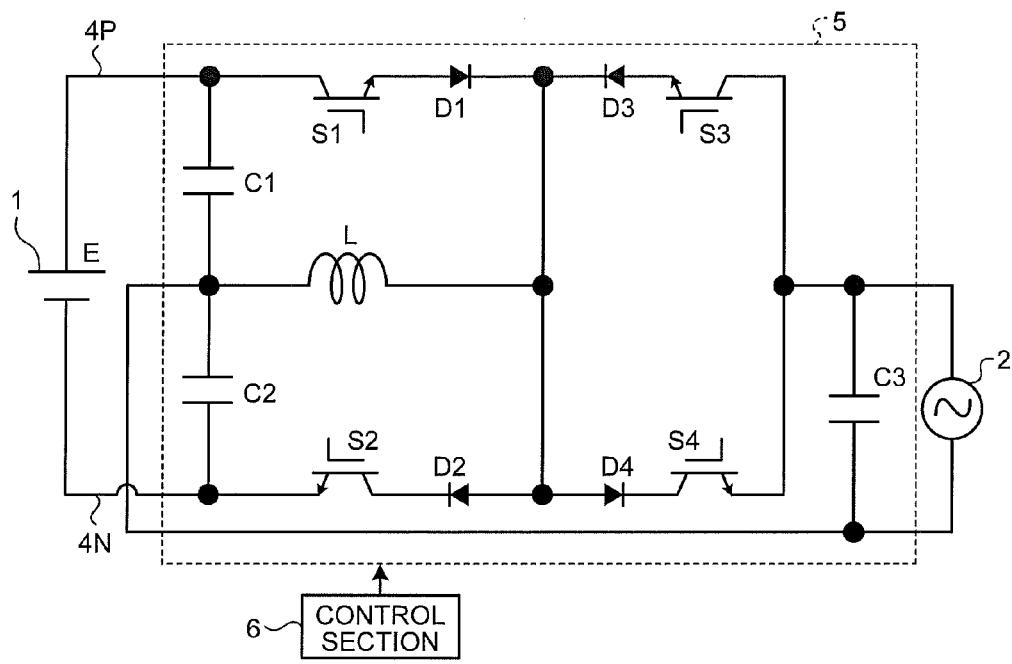
FIG. 1 is a view illustrating the configuration of an interconnection inverter device according to a first embodiment of the present invention.

FIG. 1 is a view illustrating the configuration of an interconnection inverter device according to a first embodiment of the present invention. The interconnection inverter device shown in FIG. 1 has a circuit configuration that is referred to as a current source inverter device. By way of an example, the interconnection inverter device is illustrated as including a direct-current power source 1 as a direct-current input, such as a solar battery module or a fuel cell, and converting direct-current power from the direct-current power source 1 to alternating-current power to interconnect to an electric power system 2. The inverter device is made up of an inverter circuit 5 and a control section 6 for controlling the inverter circuit 5. More specifically, the inverter circuit 5 is configured as follows.

In FIG. 1, a positive direct-current bus 4P drawn from the positive electrode of the direct-current power source 1 is connected with a switching element S1, a diode D1, a diode D3, and a switching element S3, while a negative direct-current bus 4N drawn from the negative electrode of the direct-current power source 1 is connected with a switching element S2, a diode D2, a diode D4, and a switching element S4. Both ends of the direct-current power source 1 are connected in series with a first capacitor that is a capacitor C1 and a second capacitor that is a capacitor C2. The capacitor C1 and the capacitor C2 are connected to each other at a connection point, i.e., an intermediate point between the capacitors C1 and C2, to which one end of a reactor L is connected. The other end of the reactor L is connected to both the point connected to the cathodes of the diodes D1 and D3 and the point connected to the anodes of the diodes D2 and D4. Furthermore, one end of the switching element S1 (the drain in FIG. 1) is connected to the positive pole of the capacitor C1 (the positive electrode of the direct-current power source 1), while the other end of the switching element S1 (the source in FIG. 1) is connected to the anode of the diode D1. One end of the switching element S2 (the source in FIG. 1) is connected to the negative pole of the capacitor C2 (the negative electrode of the direct-current power source 1), while the other end of the switching element S2 (the drain in FIG. 1) is connected to the cathode of the diode D2. Furthermore, one end of the switching element S3 (the source in FIG. 1) is connected to the anode of the diode D3, while one end of the switching element S4 (the drain in FIG. 1) is connected to the cathode of the diode D4, with the other ends of the switching elements S3 and S4 connected to each other. Between the connection point of the switching elements S3 and S4 and the intermediate point between the capacitors C1 and C2, the electric power system 2 and a capacitor C3 serving as filter unit are connected in parallel to each other.

Note that the diodes D1 to D4 are interposed in order to block current which may be caused when the switching elements S1 to S4 are reverse biased. Furthermore, the switching element S1 and the diode D1 function as a first switch section for controlling a current flowing through the reactor L, while the switching element S2 and the diode D2 function as a second switch section for controlling a current flowing through the reactor L. The switching element S3 and the diode D3 function as a third switch section for controlling a current flowing through the electric power system 2, while the switching element S4 and the diode D4 function as a fourth switch section for controlling a current flowing through the electric power system 2. These switch sections are each controlled by the control section 6.

Figure 2:
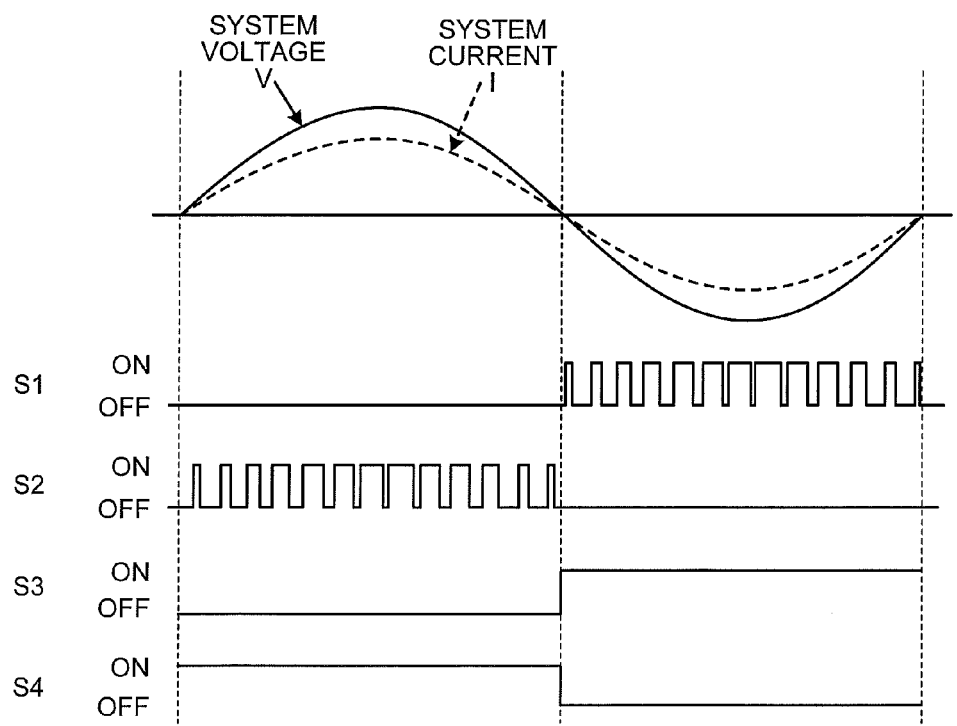
FIG. 2 is a time chart illustrating a one-cycle switching operation of the interconnection inverter device of the first embodiment.
Figure 3:
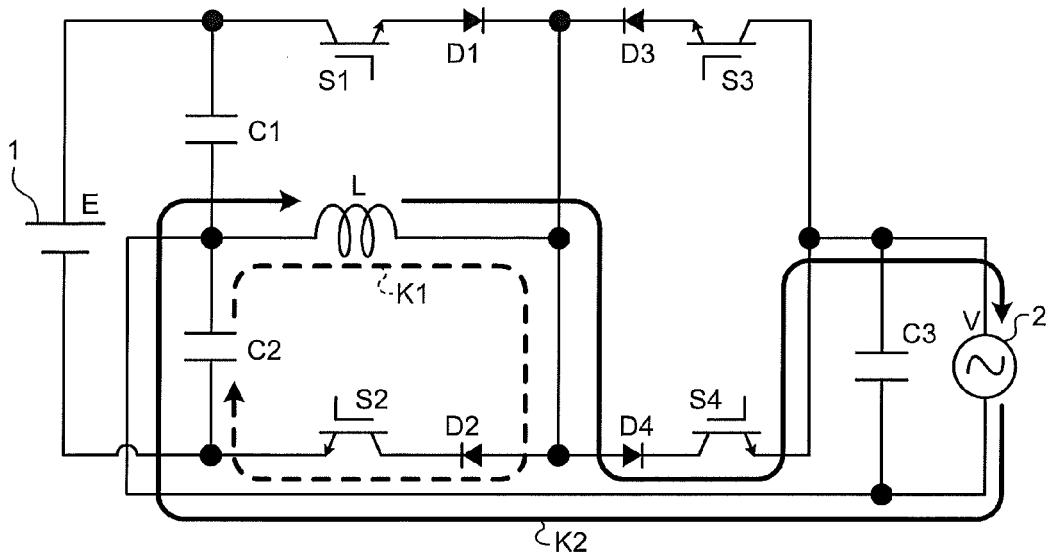
FIG. 3 is a view of the flow of current in the positive half cycle of a system voltage illustrated on the circuit diagram of FIG. 1.
Figure 4:
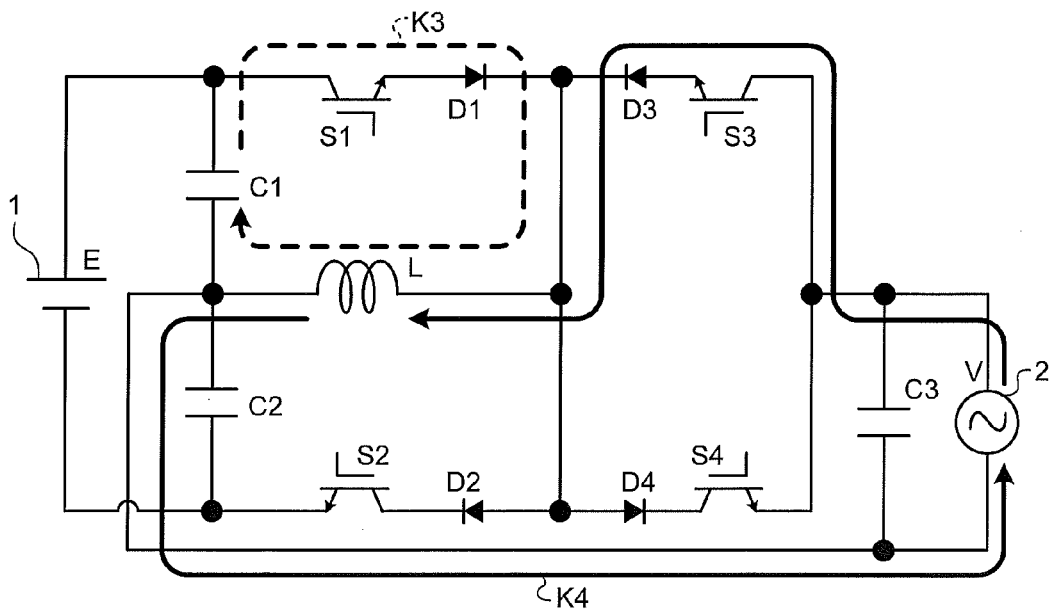
FIG. 4 is a view of the flow of current in the negative half cycle of the system voltage illustrated on the circuit diagram of FIG. 1.

A description will next be made to the operation of the interconnection inverter device according to the first embodiment with reference to FIGS. 2 to 4. FIG. 2 is a time chart showing one-cycle switching operation of the interconnection inverter device according to the first embodiment. FIG. 3 is a view of the flow of current in the positive half cycle of a system voltage illustrated on the circuit diagram of FIG. 1. FIG. 4 is a view of the flow of current in the negative half cycle of the system voltage illustrated on the circuit diagram of FIG. 1. In FIG. 2, the system voltage V is the output voltage from the electric power system 2, and the system current I is the current that flows into or out of the electric power system 2.

Note that in FIG. 2, the system voltage V is defined to be positive when the connection end between the third switch section and the fourth switch section to which one end of the electric power system is connected has a positive potential. On the other hand, the system voltage V is defined to be negative when the intermediate point between the capacitors C1 and C2 to which the other end of the electric power system is connected has a positive potential. However, in this embodiment, it is assumed that the frequency of the electric power system is known (for example, a commercial frequency of 50 Hz or 60 Hz) and the information on the polarity of the system voltage is available without detecting the system voltage. Furthermore, the system current I is defined as positive when flowing from the fourth switch section to the electric power system 2, while the system current I is defined as negative when flowing from the electric power system 2 to the third switch section.

As shown in FIG. 2, in the positive half cycle of the system voltage, the switching elements S1 and S3 are controlled to be OFF, the switching element S4 is controlled to be ON, and the switching element S2 is PWM (Pulse Width Modulation) controlled. Providing control in this manner allows a positive current to flow as indicated with a thick solid line K2 of FIG. 3 in the positive half cycle of the system voltage. On the other hand, in the negative half cycle the system voltage, the switching elements S2 and S4 are controlled to be OFF, the switching element S3 is controlled to be ON, and the switching element S1 is PWM controlled. Providing control in this fashion allows a negative current (current flowing in the direction opposite to that in FIG. 3) to flow as indicated with a thick solid line K4 of FIG. 4 in the negative half cycle of the system voltage.

A description will next be made in more detail below to the operation in each of the positive and negative half cycles of the system voltage. First, in FIG. 3 which shows the operation of the system voltage in the positive half cycle, when the switching element S2 to be PWM-controlled is ON, the current flows as indicated with a thick broken line K1, allowing electric energy from the direct-current power source 1 (the capacitor C2) to be stored as current energy in the reactor L. Note that with the system voltage V higher than a direct-current power source voltage E, the current that could otherwise start to flow from the electric power system 2 to the reactor L is blocked by the switching element S3 (normally OFF in the positive half cycle) and the diode D4. On the other hand, when the switching element S2 is switched from ON to OFF, the current energy stored in the reactor L is released and output to the electric power system 2 as indicated with a thick solid line K2.

The same holds true for the operation of the system voltage in the negative half cycle. In FIG. 4, when the switching element S1 which is PWM controlled is ON, a current flows as indicated with a thick broken line K3, allowing electric energy from the direct-current power source 1 (the capacitor C1) to be stored as current energy in the reactor L. Note that with the system voltage V higher than the direct-current power source voltage E, the current that could otherwise start to flow from the electric power system 2 to the reactor L (in the direction opposite to that in FIG. 3) is blocked by the switching element S4 (normally OFF in the negative half cycle) and the diode D3. On the other hand, when the switching element S1 is switched from ON to OFF, the current energy stored in the reactor L is released and output to the electric power system 2 as indicated with a thick solid line K4.

In the operation of the system voltage during each of the positive and negative half cycles, PWM control is provided to tailor the system current I as a sine wave, in the case of which the PWM control is intended to increase the width of the ON pulse near the peak of the system voltage but decrease the width of the ON pulse near the zero crossing point. Furthermore, the system current I is smoothed by the operation of each of the reactor L and the capacitor C3 and then supplied to the electric power system 2.

Here, in each of the aforementioned operations, the electromotive force produced in the reactor L when the switching element S1 is switched from ON to OFF can be greater than the peak voltage of the system voltage. Accordingly, even when the direct-current power source voltage E is less than the system voltage V, the interconnection inverter device of the first embodiment can supply the current energy stored in the reactor L to the electric power system 2 without providing a step-up circuit. Furthermore, even when the direct-current power source voltage E is greater than the system voltage V, a step-down circuit is not necessary. As such, the interconnection inverter device of the first embodiment provides the circuit configuration reduced in size and weight when compared with the interconnection inverter device disclosed in Patent Literature 1 above which requires the step-up circuit and the step-down circuit.

Furthermore, the interconnection inverter device disclosed in Patent Literature 1 unavoidably requires one diode and two switching elements through which the current energy stored in the reactor is supplied to the electric power system. However, in the interconnection inverter device of the first embodiment, only one diode and one switching element have to be passed through. Accordingly, the interconnection inverter device of the first embodiment provides a circuit configuration of reduced loss when compared with the interconnection inverter device disclosed in Patent Literature 1.

As described above, according to the interconnection inverter device of the first embodiment, the interconnection point of the capacitors C1 and C2 that are connected in series to both ends of a direct-current power source is connected with one end of the reactor L and one end of the electric power system, with both ends of the electric power system 2 connected with the capacitor C3 in parallel. The interconnection inverter device includes the first switch section (S1, D1) actuated when storing energy from the capacitor C1 in the reactor L; the second switch section (S2, D2) actuated when storing energy from the capacitor C2 in the reactor L; the third switch section (S3, D3) actuated when supplying the energy stored in the reactor L by the actuation of the first switch section (S1, D1) to the electric power system 2; and the fourth switch section (S4, D4) actuated when supplying the energy stored in the reactor L by the actuation of the second switch section (S2, D2) to the electric power system 2. In the positive half cycle of the system voltage, the switching elements S1 and S3 are controlled to be OFF, the switching element S4 is controlled to be ON, and the switching element S2 is PWM controlled. In the negative half cycle of the system voltage, the switching elements S2 and S4 are controlled to be OFF, the switching element S3 is controlled to be ON, and the switching element S1 is PWM controlled. This obviates a step-up circuit and a step-down circuit, thereby realizing an interconnection inverter device which can be controlled in a simplified manner.

Second Embodiment

Figure 5:
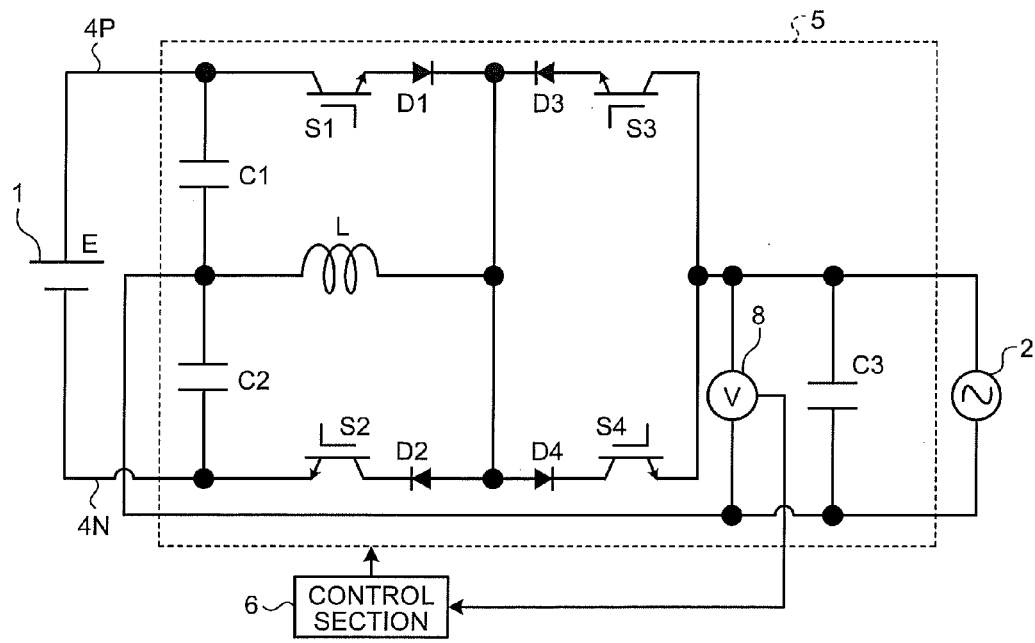
FIG. 5 is a view illustrating the configuration of an interconnection inverter device according to a second embodiment of the present invention.

FIG. 5 is a view illustrating the configuration of an interconnection inverter device according to a second embodiment of the present invention. The interconnection inverter device of the first embodiment shown in FIG. 1 is configured on the precondition that the electric power system employs a known frequency and will not use information on the system voltage polarity. However, the interconnection inverter device of the second embodiment is configured as illustrated to include a system voltage detection section 8 for detecting the polarity of the system voltage and supply a value detected by the system voltage detection section 8 to the control section 6.

The interconnection inverter device of the second embodiment can determine the polarity of the system voltage based on the value detected by the system voltage detection section 8. Thus, even with the frequency of the electric power system being unknown, the inverter device can provide switching control to the first through fourth switch sections depending on the polarity of the system voltage. As a result, this makes it possible to provide improved energy efficiency for interconnection as compared to the interconnection inverter device of the first embodiment.

Third Embodiment

Figure 6:
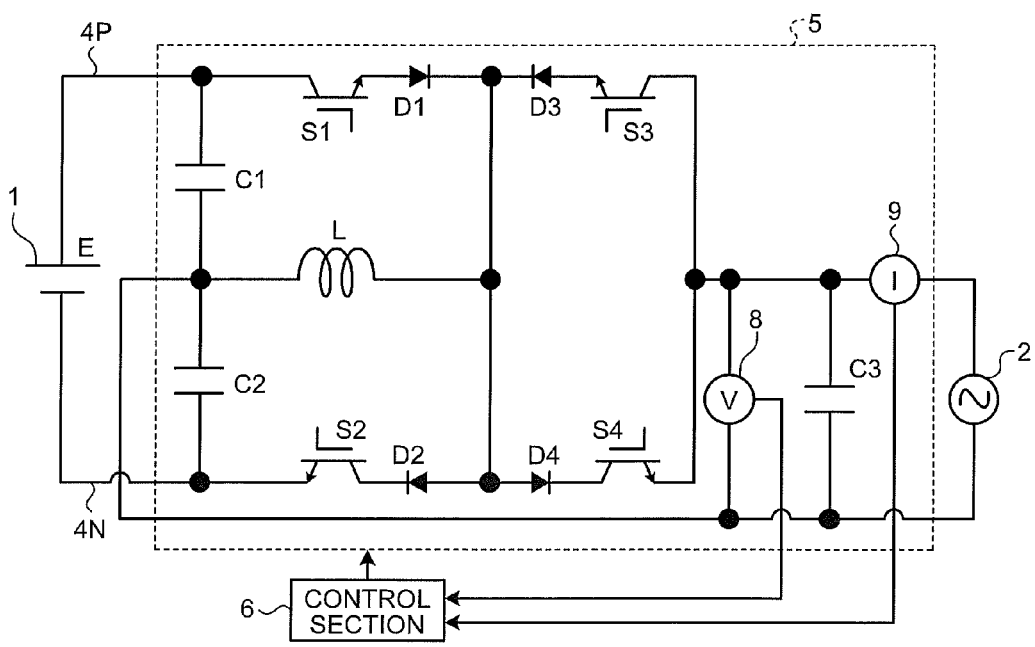
FIG. 6 is a view illustrating the configuration of an interconnection inverter device according to a third embodiment of the present invention.

FIG. 6 is a view illustrating the configuration of an interconnection inverter device according to a third embodiment of the present invention. The interconnection inverter device of the second embodiment shown in FIG. 5 is configured, as disclosed, to include the system voltage detection section 8 for detecting the polarity of the system voltage. In contrast, the interconnection inverter device of the third embodiment is configured, as illustrated, to further include a system current detection section 9 for detecting a current (system current) flowing into or out of the electric power system 2 and supply the value detected by each of the system voltage detection section 8 and the system current detection section 9 to the control section 6.

A description will next be made to the operation of the interconnection inverter device according to the third embodiment with reference to FIG. 7. FIG. 7 is a time chart showing one-cycle switching operation by the interconnection inverter device of the third embodiment. Note that the polarities of the system current I and the system voltage V are defined in the same manner as in the first embodiment.

As shown in FIG. 7, the interconnection inverter device of the third embodiment provides control of different types to the first through fourth switch sections depending on the sign of the system voltage V and the system current I, which will be more specifically described as follows.

(1) When the system voltage V has a positive polarity and the system current I has a negative polarity,
the switching elements S2 and S4 are controlled to be OFF, the switching element S1 is controlled to be ON, and the switching element S3 is PWM controlled;

(2) When the system voltage V has a positive polarity and the system current I has a positive polarity,
the switching elements S1 and S3 are controlled to be OFF, the switching element S4 is controlled to be ON, and the switching element S2 is PWM controlled;

(3) When the system voltage V has a negative polarity and the system current I has a positive polarity,
the switching elements S1 and S3 are controlled to be OFF, the switching element S2 is controlled to be ON, and the switching element S4 is PWM controlled; and (4) When the system voltage V has a negative polarity and the system current I has a negative polarity,
the switching elements S2 and S4 are controlled to be OFF, the switching element S3 is controlled to be ON, and the switching element S1 is PWM controlled.

The interconnection inverter device of the third embodiment can determine the polarity of the system voltage and the system current based on the output from the system voltage detection section 8 and the system current detection section 9. Thus, even when the frequency of the electric power system is unknown and there occurs a phase difference between the system voltage and the system current, the inverter device can provide switching control to the first through fourth switch sections depending on the polarity of the system voltage and the system current. As a result, this makes it possible to provide improved energy efficiency for interconnection as compared to the interconnection inverter device of the first and second embodiments.

Industrial Applicability

As described above, the interconnection inverter device according to the present invention can advantageously obviates a step-up circuit and a step-down circuit, and can be controlled in a simplified manner.

Reference Signs List

1 DIRECT-CURRENT POWER SOURCE
2 ELECTRIC POWER SYSTEM
4P, 4N DIRECT-CURRENT BUS
5 INVERTER CIRCUIT
6 CONTROL SECTION
8 SYSTEM VOLTAGE DETECTION SECTION
9 SYSTEM CURRENT DETECTION SECTION
C1 to C3 CAPACITOR
D1 to D4 DIODE
L REACTOR
S1 to S4 SWITCHING ELEMENT

The invention claimed is:

1. An interconnection inverter device for converting direct-current power fed from a direct-current power source to alternating-current power to interconnect to an electric power system, the interconnection inverter device comprising:
    first and second capacitors which are connected in series between a positive and a negative electrode of the direct-current power source and an interconnection point of which is connected to a first terminal of the electric power system;
    a reactor with a first terminal connected to the interconnection point between the first capacitor and the second capacitor;
    a first switch section with a first terminal connected to a positive electrode of the direct-current power source and a second terminal connected to a second terminal of the reactor;
    a second switch section with a first terminal connected to a negative electrode of the direct-current power source and a second terminal connected to the second terminal of the reactor;
    a third switch section with a first terminal connected to the second terminal of the reactor and a second terminal connected to a second terminal of the electric power system;
    a fourth switch section with a first terminal connected to the second terminal of the reactor and a second terminal connected to the second terminal of the electric power system; and
    a third capacitor connected, in parallel, to the first terminal and the second terminal of the electric power system.

2. An interconnection inverter device for converting direct-current power fed from a direct-current power source to alternating-current power to interconnect to an electric power system, the interconnection inverter device comprising:
    first and second capacitors which are connected in series between a positive and a negative electrode of the direct-current power source and an interconnection point of which is connected to a first terminal of the electric power system;
    a reactor with a first terminal connected to the interconnection point between the first capacitor and the second capacitor;
    a first switch section actuated when energy from the first capacitor is stored in the reactor;
    a second switch section actuated when energy from the second capacitor is stored in the reactor;
    a third switch section actuated when the energy stored in the reactor is supplied by the actuation of the first switch section to the electric power system;
    a fourth switch section actuated when the energy stored in the reactor is supplied by the actuation of the second switch section to the electric power system; and
    a third capacitor connected, in parallel, to the first terminal and a second terminal of the electric power system.

3. The interconnection inverter device according to claim 2, wherein
    the first switch section is controlled to be OFF during a positive half cycle of a system voltage and PWM-controlled during a negative half cycle,
    the second switch section is PWM-controlled during the positive half cycle of the system voltage and controlled to be OFF during the negative half cycle,
    the third switch section is controlled to be OFF during the positive half cycle of the system voltage and controlled to be ON during the negative half cycle, and
    the fourth switch section is controlled to be ON during the positive half cycle of the system voltage and controlled to be OFF during the negative half cycle.

4. The interconnection inverter device according to claim 3, further comprising a system voltage detection section for detecting an output voltage from the electric power system as the system voltage.

5. The interconnection inverter device according to claim 2, further comprising:
    a system voltage detection section for detecting an output voltage from the electric power system as the system voltage; and
    a system current detection section for detecting a current flowing into and out of the electric power system as a system current, and wherein
    when the system voltage has a positive polarity and the system current has a negative polarity, the second and fourth switch sections are controlled to be OFF, the first switch section is controlled to be ON, and the third switch section is PWM controlled,
    when the system voltage has a positive polarity and the system current has a positive polarity, the first and third switch sections are controlled to be OFF, the fourth switch section is controlled to be ON, and the second switch section is PWM controlled,
    when the system voltage has a negative polarity and the system current has a positive polarity, the first and third switch sections are controlled to be OFF, the second switch section is controlled to be ON, and the fourth switch section is PWM controlled, and
    when the system voltage has a negative polarity and the system current has a negative polarity, the second and fourth switch sections are controlled to be OFF, the third switch section is controlled to be ON, and the first switch section is PWM controlled.

6. The interconnection inverter device according to claim 1, wherein
    the first switch section is controlled to be OFF during a positive half cycle of a system voltage and PWM-controlled during a negative half cycle,
    the second switch section is PWM-controlled during the positive half cycle of the system voltage and controlled to be OFF during the negative half cycle,
    the third switch section is controlled to be OFF during the positive half cycle of the system voltage and controlled to be ON during the negative half cycle, and the fourth switch section is controlled to be ON during the positive half cycle of the system voltage and controlled to be OFF during the negative half cycle.

7. The interconnection inverter device according to claim 6, further comprising a system voltage detection section for detecting an output voltage from the electric power system as the system voltage.

8. The interconnection inverter device according to claim 1, further comprising:
- a system voltage detection section for detecting an output voltage from the electric power system as the system voltage; and
- a system current detection section for detecting a current flowing into and out of the electric power system as a system current, and wherein
- when the system voltage has a positive polarity and the system current has a negative polarity, the second and fourth switch sections are controlled to be OFF, the first switch section is controlled to be ON, and the third switch section is PWM controlled,
- when the system voltage has a positive polarity and the system current has a positive polarity, the first and third switch sections are controlled to be OFF, the fourth switch section is controlled to be ON, and the second switch section is PWM controlled,
- when the system voltage has a negative polarity and the system current has a positive polarity, the first and third switch sections are controlled to be OFF, the second switch section is controlled to be ON, and the fourth switch section is PWM controlled, and
- when the system voltage has a negative polarity and the system current has a negative polarity, the second and fourth switch sections are controlled to be OFF, the third switch section is controlled to be ON, and the first switch section is PWM controlled.

* * * * *